United States Patent
Lee et al.

(10) Patent No.: US 12,304,321 B2
(45) Date of Patent: May 20, 2025

(54) CONTROL APPARATUS AND CONTROL METHOD OF AN ELECTRIC VEHICLE

(71) Applicants: Hyundai Motor Company, Seoul (KR); Kia Corporation, Seoul (KR); HYUNDAI WIA CORPORATION, Changwon-si (KR)

(72) Inventors: Taewoo Lee, Suwon-Si (KR); Jeong Won Song, Hwaseong-Si (KR); Woocheol Cho, Hwaseong-Si (KR); Joonhee Lee, Yongin-Si (KR); Kyunghan Min, Incheon (KR); Sung Keun Lim, Hwaseong-Si (KR); JunSeok Park, Seoul (KR); Jong Chan Lee, Hanam-Si (KR); Heon Kang, Hwaseong-Si (KR)

(73) Assignees: Hyundai Motor Company, Seoul (KR); Kia Corporation, Seoul (KR); HYUNDAI WIA CORPORATION, Changwon-si (KR)

(*) Notice: Subject to any disclaimer, the term of this patent is extended or adjusted under 35 U.S.C. 154(b) by 212 days.

(21) Appl. No.: 18/200,343

(22) Filed: May 22, 2023

(65) Prior Publication Data

US 2024/0059157 A1 Feb. 22, 2024

(30) Foreign Application Priority Data

Aug. 17, 2022 (KR) .......................... 10-2022-0102608

(51) Int. Cl.
*B60L 15/20* (2006.01)
*B60L 7/18* (2006.01)

(52) U.S. Cl.
CPC ............. *B60L 15/2036* (2013.01); *B60L 7/18* (2013.01); *B60L 15/2009* (2013.01);
(Continued)

(58) Field of Classification Search
CPC ............. B60L 15/2009; B60L 15/2036; B60L 15/2054; B60L 2240/12; B60L 2240/24; B60L 2240/465; B60L 2240/507
See application file for complete search history.

(56) References Cited

U.S. PATENT DOCUMENTS

| | | | |
|---|---|---|---|
| 8,930,075 B2 * | 1/2015 | Ramirez Ruiz | B62D 17/00 701/40 |
| 2012/0217076 A1 * | 8/2012 | Favaretto | B60K 1/04 180/65.21 |

(Continued)

*Primary Examiner* — Tyler J Lee
(74) *Attorney, Agent, or Firm* — Morgan, Lewis & Bockius LLP

(57) ABSTRACT

A control apparatus of an electric vehicle includes a twin clutch including a first clutch and a second clutch and configured to adjust power transmission from a drive motor to a first rear wheel and a second rear wheel of the vehicle through the first clutch corresponding to the first rear wheel and the second clutch corresponding to the second rear wheel, a vehicle controller electrically connected to the drive motor and configured to, when an entering condition for entering an oversteer mode is satisfied, determine an initial regenerative braking torque for entering the oversteer mode, determine a target slip ratio of the first and second rear wheels, and control the regenerative braking torque of the drive motor to follow the target slip ratio, and a clutch controller electrically connected to the twin clutch and configured to adjust clutch torques of the first clutch and the second clutch of the twin clutch so that slip ratios of the first and second rear wheels are synchronized.

19 Claims, 7 Drawing Sheets

(52) U.S. Cl.
CPC ....... *B60L 2240/12* (2013.01); *B60L 2240/24* (2013.01); *B60L 2240/507* (2013.01); *B60L 2250/26* (2013.01)

(56) References Cited

U.S. PATENT DOCUMENTS

| | | | |
|---|---|---|---|
| 2013/0190980 A1* | 7/2013 | Ramirez Ruiz .... | B60G 17/0162 |
| | | | 701/38 |
| 2013/0197756 A1* | 8/2013 | Ramirez Ruiz ........ | B62D 17/00 |
| | | | 701/40 |
| 2015/0176696 A1* | 6/2015 | Hidaka .................... | F28D 1/04 |
| | | | 184/6.1 |
| 2019/0249725 A1* | 8/2019 | Kocevar ................. | F16D 13/52 |
| 2022/0111837 A1* | 4/2022 | Yeom .............. | B60W 60/00186 |
| 2024/0042871 A1* | 2/2024 | Wurm ................ | B60L 15/2045 |

* cited by examiner

FIG. 6

|  | Vehicle speed (kph) | | | | |
| --- | --- | --- | --- | --- | --- |
|  | 60 | 80 | 100 | 120 | 160 |
| Target slip ratio (%) | 10 | 7 | 4 | 2 | 1 |

FIG. 7

|  | Vehicle speed (kph) | | | | |
|---|---|---|---|---|---|
|  | 60 | 80 | 100 | 120 | 160 |
| Initial regenerative braking torque (Nm) | -70 | -55 | -40 | -20 | -10 |

CONTROL APPARATUS AND CONTROL METHOD OF AN ELECTRIC VEHICLE

CROSS-REFERENCE TO RELATED APPLICATION

The present application claims priority to Korean Patent Application No. 10-2022-0102608 filed on Aug. 17, 2022, the entire contents of which is incorporated herein for all purposes by this reference.

BACKGROUND OF THE PRESENT DISCLOSURE

Field of the Present Disclosure

The present disclosure relates to a control apparatus and control method of an electric vehicle. More particularly, the present disclosure relates to a control apparatus and control method of an electric vehicle capable of stably realizing an oversteer mode by use of a twin clutch.

Description of Related Art

The oversteer mode refers to a characteristic in which the rear wheels are pushed outward of a turning circle and the front wheels are turned relatively inward of the turning circle when the vehicle turns. Accordingly, the turning radius of the vehicle becomes smaller than the steering angle of the driver.

To the contrary, an understeer mode refers to a characteristic in which the front wheels are pushed outward of the turning circle and the rear wheels are turned relatively inward of the turning circle. Accordingly, the turning radius of the vehicle becomes greater than the steering angle of the driver.

When such an oversteer or understeer phenomenon occurs, the driver's attention is required because the behavior of the vehicle may be different from the driver's intention.

Generally, in the case of commercialized vehicles, the understeer is intentionally set to improve linear stability and safety of the vehicle.

On the other hand, in the case of high-performance vehicles (e.g., sports cars, etc.), a driver typically attempts to utilize the oversteer phenomena for effectively turning the vehicle in the corner.

Thus, when the oversteer mode may be safely and stably realized for the high performance vehicles according to the driver's intention, it may be a very important advantage for marketing of the vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a control apparatus and control method of an electric vehicle configured for smoothly realizing an oversteer mode according to a driver's request.

A control apparatus of an electric vehicle includes a twin clutch including a first clutch and a second clutch and configured to adjust power transmission from a drive motor to a first rear wheel and a second rear wheel of the vehicle through the first clutch corresponding to the first rear wheel and the second clutch corresponding to the second rear wheel, a vehicle controller electrically connected to the drive motor and configured to, when an entering condition for entering an oversteer mode is satisfied, determine an initial regenerative braking torque for entering the oversteer mode, determine a target slip ratio of the first and second rear wheels, and control the regenerative braking torque of the drive motor to follow the target slip ratio, and a clutch controller electrically connected to the twin clutch and configured to adjust clutch torques of the first clutch and the second clutch of the twin clutch so that slip ratios of the first and second rear wheels are synchronized.

The entering condition may include the drive mode of the vehicle being a sports mode, an accelerator pedal signal being OFF, a brake pedal signal being OFF, a steering angle of a steering wheel being above a preset angle, and an electronic stability control apparatus being in a $2^{nd}$ OFF state.

The target slip ratio may be determined based on a vehicle speed.

The target slip ratio may be determined to be inversely proportional to the vehicle speed.

The initial regenerative braking torque may be determined based on a vehicle speed.

The initial regenerative braking torque may be determined to be inversely proportional to the vehicle speed.

When a release condition is satisfied, the vehicle controller may be configured to control the drive motor so that the vehicle runs in a normal drive mode.

The release condition may be satisfied when an operation signal of an accelerator pedal or a brake pedal of the vehicle is detected.

A control method of an electric vehicle includes determining whether an entering condition for entering an oversteer mode is satisfied, determining a target slip ratio of a rear wheel when the entering condition is satisfied, applying an initial regenerative braking torque to the rear wheel through a drive motor, controlling the regenerative braking torque of the drive motor to follow the target slip ratio, and adjusting clutch torques of first clutch and second clutch of a twin clutch so that slip ratios of left and right rear wheels are synchronized.

The entering condition may include the drive mode of the vehicle being a sports mode, an accelerator pedal signal being OFF, a brake pedal signal being OFF, a steering angle of a steering wheel being above a preset angle, and an electronic stability control apparatus being in a $2^{nd}$ OFF state.

The target slip ratio may be determined based on a vehicle speed.

The target slip ratio may be determined to be inversely proportional to the vehicle speed.

The initial regenerative braking torque may be determined based on a vehicle speed.

The initial regenerative braking torque may be determined to be inversely proportional to the vehicle speed.

When a release condition is satisfied, a vehicle controller may be configured to control the drive motor so that the vehicle runs in a normal drive mode.

The release condition may be satisfied when an operation signal of an accelerator pedal or a brake pedal of the vehicle is detected.

According to a control apparatus and control method of an electric vehicle according to an exemplary embodiment of the present disclosure, an oversteer mode in response to a driver's request may be stably realized by use of a twin clutch.

Furthermore, marketability of the vehicle may be improved by realizing the oversteer mode in response to the driver's request.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 6 is a table showing a target slip ratio according to an exemplary embodiment of the present disclosure.

FIG. 7 is a table showing an initial regenerative braking torque according to an exemplary embodiment of the present disclosure.

Figure 1:
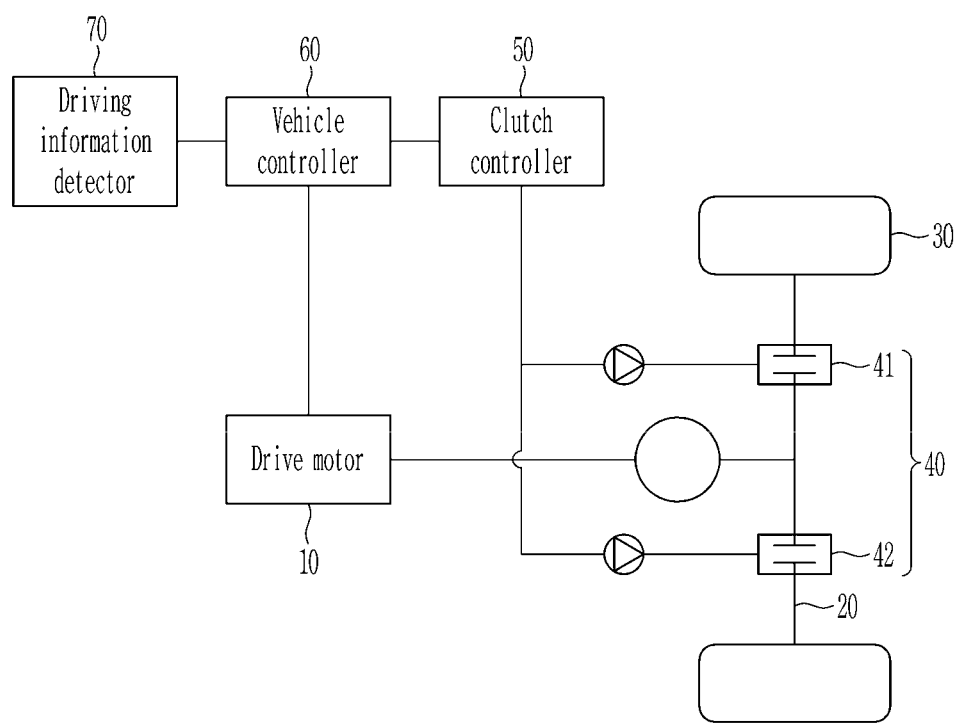
FIG. 1 is a schematic diagram showing a control apparatus of an electric vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure will be described more fully hereinafter with reference to the accompanying drawings, in which embodiments of the present disclosure are shown. As those skilled in the art would realize, the described embodiments may be modified in various different ways, all without departing from the spirit or scope of the present disclosure.

To clearly describe the present disclosure, portions that are irrelevant to the description are omitted, and identical or similar constituent elements throughout the specification are denoted by the same reference numerals.

Furthermore, since the size and thickness of each configuration shown in the drawings are arbitrarily shown for convenience of description, the present disclosure is not necessarily limited to configurations illustrated in the drawings, and in order to clearly illustrate several parts and areas, enlarged thicknesses are shown.

Hereinafter, a control apparatus of an electric vehicle according to an exemplary embodiment of the present disclosure is described in detail with reference to the drawings.

FIG. 1 is a schematic diagram showing a control apparatus of an electric vehicle according to an exemplary embodiment of the present disclosure. Furthermore, FIG. 2 is a block diagram showing a control apparatus of an electric vehicle according to an exemplary embodiment of the present disclosure.

Figure 2:
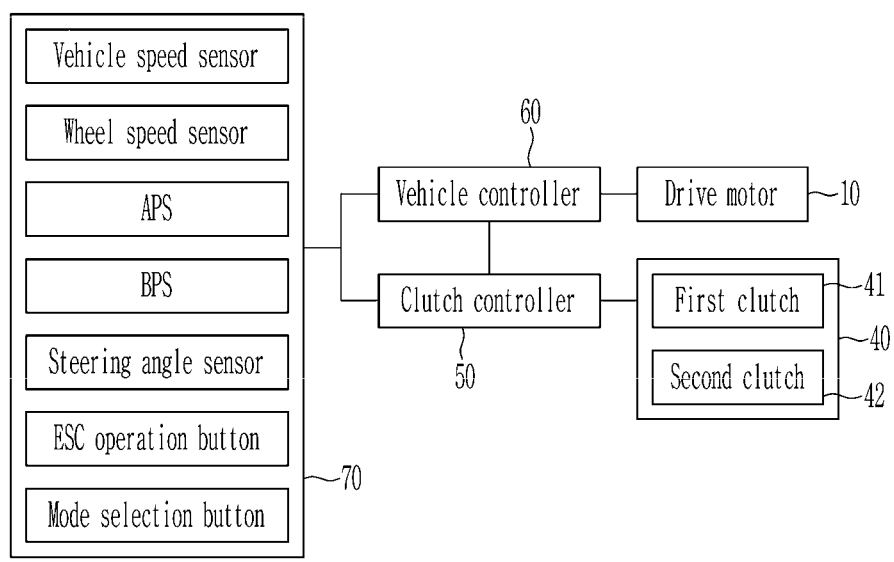
FIG. 2 is a block diagram showing a control apparatus of an electric vehicle according to an exemplary embodiment of the present disclosure.

As shown in FIG. 1 and in FIG. 2, a control apparatus of an electric vehicle according to various exemplary embodiments of the present disclosure may include a drive motor 10, a vehicle controller 60, a twin clutch 40, a clutch controller 50.

The drive motor 10 generates a driving force required for driving of the vehicle by use of electrical energy, and the vehicle moves as the driving force generated by the drive motor 10 is supplied to the drive wheels (e.g., rear wheels) 30 or all wheels of the vehicle.

The drive motor 10 may be configured to generate electrical energy by operating as a generator as needed (e.g., in a regenerative braking mode).

In an exemplary embodiment of the present disclosure, the torque generated by the drive motor 10 for driving of the vehicle is called a driving torque, and a torque generated in the reverse direction as the drive motor 10 operates as a generator when the vehicle coasts or is braked is called a regenerative braking torque.

The twin clutch 40 is provided on an axle 20 on which drive wheels 30 are mounted, and includes a first clutch 41 and a second clutch 42 provided at respective sides of the axle 20 after an output shaft of a speed reducer. According to engagement and disengagement of the twin clutch 40, the driving torque supplied from the drive motor 10 to the drive wheel 30 is supplied to or cut off from the drive wheels (e.g., rear wheels) 30, and the driving torques supplied to the drive wheels are adjusted as needed.

The first clutch 41 and the second clutch 42 of the twin clutch 40 respectively includes a pack of clutch plates and clutch disks, and engaged or disengaged according to a hydraulic pressure generated by and supplied from a hydraulic pressure pump. That is, the clutches 41 and 42 are engaged when the clutch plates and clutch disks are frictionally coupled to each other by the hydraulic pressure supplied from the hydraulic pressure pump. To the contrary, the clutch is disengaged or released due to disengagement of the clutch plates and the clutch disks when the hydraulic pressure is not generated by or supplied from the hydraulic pressure pump.

In an exemplary embodiment of the present disclosure, a torque (hereinafter, called a clutch torque) applied to respective clutch may be controlled by independently adjusting levels of the hydraulic pressures applied to the first clutch 41 and the second clutch 42. By independently controlling the clutch torques of the first clutch 41 and the second clutch 42, the levels of driving torques distributed to the drive wheels 30 through the first clutch 41 and the second clutch 42 may be adjusted. The level of the hydraulic pressure generated by the hydraulic pressure pump and applied to respective clutches may be a torque applied to respective clutch.

The torque applied to the clutch according to the magnitude of the hydraulic pressure may be determined by an experiment and stored in the clutch controller 50 in advance.

The vehicle controller 60 may be configured for controlling various components required for running of the vehicle including the drive motor 10, and may perform a cooperative control with the clutch controller 50 as needed.

Depending on implementations, the clutch controller 50 and the vehicle controller 60 may be integrated or distributed (or to be separate). In an exemplary embodiment of the present disclosure, an example in which the clutch controller 50 and the vehicle controller 60 are implemented in a distributed manner will be described.

Each of the clutch controller 50 and the vehicle controller 60 may be provided as at least one processor operable by a predetermined program, and the predetermined program may be programmed to perform each steps in a control method of an electric vehicle including the twin clutch 40 according to an exemplary embodiment of the present disclosure.

Meanwhile, a control apparatus of an electric vehicle according to an exemplary embodiment of the present disclosure includes a driving information detector 70 configured to detect driving information required for driving the vehicle, and the driving information detected by the driving information detector 70 is transmitted to the clutch controller 50 and the vehicle controller 60.

The driving information may include a vehicle speed, a wheel speed, an accelerator pedal opening, a brake pedal opening, turning state of the vehicle, a drive mode of the vehicle, a state of an electronic stability control (ESC) apparatus, and a steering angle of a steering wheel.

For such a purpose, the driving information detector 70 may include a vehicle speed sensor configured for detecting the vehicle speed, a wheel speed sensor configured for detecting the wheel speed, an accelerator pedal sensor (APS) for detecting the accelerator pedal opening, a brake pedal sensor (BPS) for detecting the brake pedal opening, a lateral acceleration sensor configured for detecting the turning state of the vehicle (or, a yaw rate sensor configured for detecting a yaw rate of the vehicle), and a steering angle sensor configured for detecting a steering angle of the steering wheel.

The accelerator pedal opening detected by the accelerator pedal sensor may be in a range of 0% (when not pressed by the driver) to 100% (when fully depressed by the driver), and the brake pedal opening detected by the brake pedal sensor may be in a range of 0% (when not pressed by the driver) to 100% (when fully depressed by the driver).

The electronic stability control apparatus is an apparatus improving stability in vehicle dynamics by stably maintaining the posture of the vehicle in response to an abrupt change in the steering angle of the steering wheel. When the vehicle is turned on, the electronic stability control apparatus is also kept on. When the driver briefly presses (for example, within 2 seconds) an operation button of the electronic stability control apparatus, the operation of the electronic stability control apparatus is partially stopped ($1^{st}$ stage OFF). In the present $1^{st}$ stage OFF of the electronic stability control apparatus, the function of controlling the driving torque is released, but the function of controlling the brake is maintained. When the driver presses the operation button of the electronic stability control apparatus for a long time (for example, 3 or more seconds), the operation of the electronic stability control apparatus is completely stopped ($2^{nd}$ stage OFF). That is, in the $2^{nd}$ stage OFF of the electronic stability control apparatus, the function of controlling the driving torque control and the function of controlling the brake are released.

The drive mode of the vehicle may include a fuel efficiency mode (also called an eco mode), a normal mode, a snow mode, a comfort mode, a sports mode, and the like. The fuel efficiency mode is for realizing higher fuel efficiency, the sports mode is for improving acceleration performance and response of the vehicle, the snow mode is for preventing the vehicle from slipping on slippery roads such as snowy roads, and the comfort mode is for providing comfort to the occupants by maximizing the ride comfort by reducing noise, vibration, and harshness (NVH) of the vehicle. The drive mode of the vehicle may be determined by a driver manipulating a mode selection button.

Hereinafter, an operation of the electric vehicle including the twin clutch according to an exemplary embodiment as described above will be described in detail with reference to the accompanying drawings.

Figure 3:
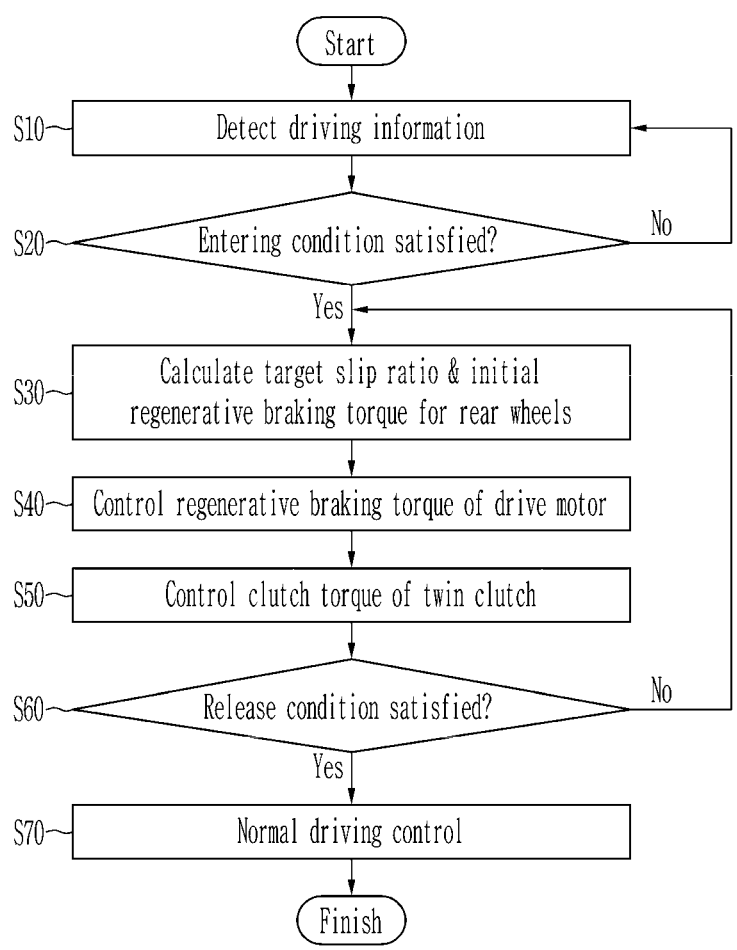
FIG. 3 is a flowchart showing a control method of an electric vehicle according to an exemplary embodiment of the present disclosure.
Figure 4:
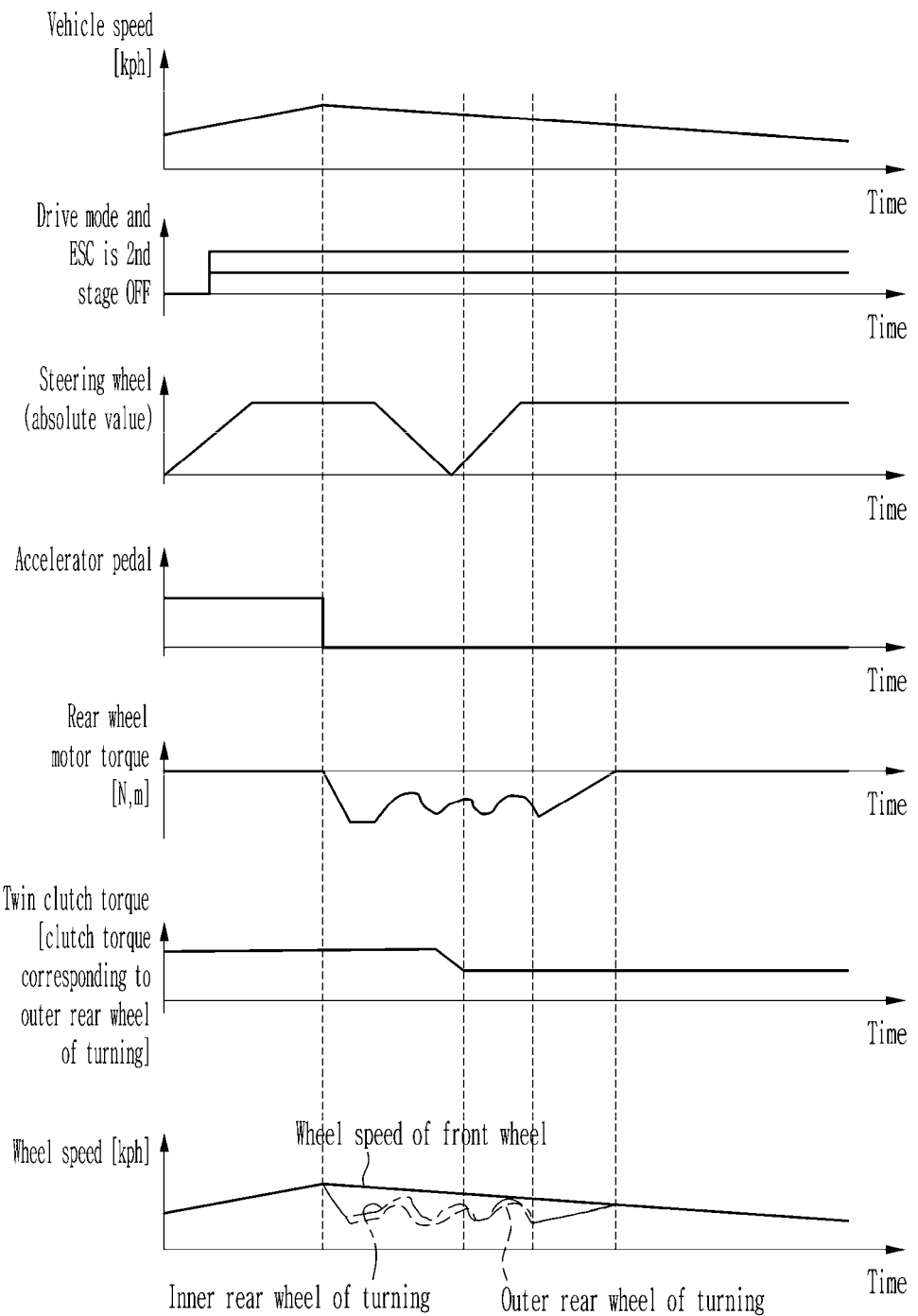
FIG. 4 is a diagram chart illustrating a control method of an electric vehicle according to an exemplary embodiment of the present disclosure.
Figure 5:
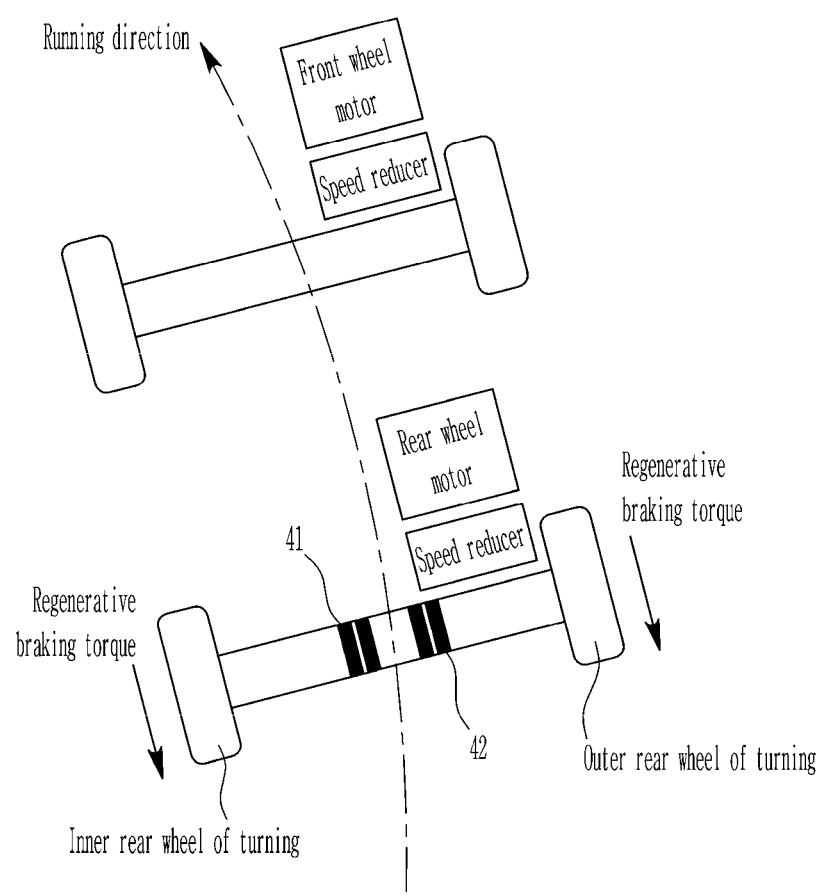
FIG. 5 illustrates a drifting state of an electric vehicle according to an exemplary embodiment of the present disclosure.

FIG. 3 is a flowchart showing a control method of an electric vehicle according to an exemplary embodiment of the present disclosure. FIG. 4 is a diagram chart illustrating a control method of an electric vehicle according to an exemplary embodiment of the present disclosure. FIG. 5 illustrates a drifting state of an electric vehicle according to an exemplary embodiment of the present disclosure.

Referring to FIG. 3 to FIG. 5, at step S10, the driving information detector 70 detects the driving information required for driving the vehicle, and the detected driving information is transmitted to the vehicle controller 60 and the clutch controller 50.

Here, the driving information detected by the driving information detector 70 is a same as have been described above, and thus is omitted.

At step S20, while the vehicle is turning, the vehicle controller 60 is configured to determine whether an entering condition for entering an oversteer mode is satisfied.

Here, the entering condition for entering the oversteer mode may include the drive mode of the vehicle is the sports mode, the accelerator pedal signal is OFF (or, the accelerator pedal opening is 0%), the brake pedal signal is OFF (or, the brake pedal opening is 0%), the steering angle of the steering wheel being above a preset angle, and the electronic stability control apparatus being in a $2^{nd}$ stage OFF state so that the entering condition is determined to be satisfied when the above listed segment conditions are all met.

At step S30, when the entering condition is satisfied, the vehicle controller 60 is configured to determine a target slip ratio (or slip amount) and an initial regenerative braking torque for the rear wheel.

The target slip ratio for the rear wheel is determined based on a current vehicle speed, for example, according to Equation 1 below, and may be stored in advance in the vehicle controller 60 in a form of map data.

$$\text{target slip ratio} = (\text{vehicle speed} - \text{wheel speed})/\text{vehicle speed} * 100\% \qquad \text{[Equation 1]}$$

In an exemplary embodiment of the present disclosure, the target slip ratio may be determined to be inversely proportional to the vehicle speed (refer to FIG. 6). That is, when the target slip ratio is set lower when the vehicle is driven at a relatively higher speed, and the target slip ratio is set higher when the vehicle is driven at a relatively lower speed, the vehicle may enter the oversteer mode smoothly.

The initial regenerative braking torque is determined based on the current vehicle speed, and may be stored in advance in the vehicle controller 60 in a form of map data.

In an exemplary embodiment of the present disclosure, the initial regenerative braking torque may be determined to be inversely proportional to the current vehicle speed (refer to FIG. 7).

After the initial regenerative braking torque is applied to rear wheel by the drive motor 10, at step S40, the vehicle controller 60 is configured to control the regenerative braking torque of the drive motor 10 to follow the target slip ratio. At the instant time, the vehicle controller 60 operates the drive motor 10 as a generator to generate the regenerative braking torque to follow the target slip ratio. That is, the vehicle controller 60 initiates the slip on the rear wheel by generating and applying the initial regenerative braking torque by the drive motor 10 to the rear wheel, and then controls the regenerative braking torque of the drive motor 10 to enable the slip ratio of the rear wheel to follow (e.g., maintain) the target slip ratio.

When the vehicle turns, a difference may occur between slip amounts (or, slip ratios) of left and right rear wheels. For example, when the vehicle turns to the left, the vehicle weight (load) moves to the right, and therefore, the slip amount generated at the left side rear wheel (or, turning-inner rear wheel) becomes greater than the slip amount generated at the right side rear wheel (or, turning-external rear wheel).

In the instant case, because a difference occurs in the slip amounts of the left and right rear wheels, an abnormal behavior of the vehicle which is not intended by the driver may be caused.

To solve the present disadvantage, at step S50, the clutch controller 50 adjusts, based on the vehicle's driving situation, the clutch torques of the first clutch 41 and the second clutch 42 of the twin clutch 40 so that the slip ratios of the left and right rear wheels are synchronized.

For example, it may be controlled so that in the oversteer situation, a clutch torque of a clutch corresponding to the turning-external rear wheel is greater than a clutch torque of a clutch corresponding to the turning-inner rear wheel, in the understeer situation, a clutch torque of a clutch corresponding to the turning-external rear wheel is smaller than a clutch torque of a clutch corresponding to the turning-inner rear wheel, and in the counter-steer situation, a clutch torque of a clutch corresponding to the turning-external rear wheel is the same as a clutch torque of a clutch corresponding to the turning-inner rear wheel.

At step S60, the vehicle controller 60 is configured to determine whether a release condition for finishing the oversteer mode is satisfied. Here, a release condition may be determined to be satisfied when an operation signal of the accelerator pedal (or, a brake pedal) is detected by the driving information detector 70 (for example, when the accelerator pedal opening or the brake pedal opening is above a predetermined value) satisfied.

When the release condition is satisfied, the vehicle controller 60 releases the oversteer mode, and at step S70, controls the drive motor 10 so that the vehicle may be driving in a normal drive mode.

According to a control apparatus and control method of an electric vehicle according to an exemplary embodiment of the present disclosure, by enabling the vehicle to enter the oversteer mode through a simple operation of the driver, marketability of a high performance vehicle may be secured, and more fun-to-drive may be provided to the driver.

Furthermore, when having entered the oversteer mode, slip amounts of internal and external rear wheels of turning is synchronized through the twin clutch 40, and thereby an abnormal behavior of the vehicle in the oversteer mode may be prevented.

While the present disclosure has been described in connection with what is presently considered to be practical embodiments, it is to be understood that the present disclosure is not limited to the disclosed exemplary embodiments of the present disclosure. On the other hand, it is intended to cover various modifications and equivalent claims as well as various alternatives and modifications thereof. It is intended that the scope of the present disclosure be defined by the Claims appended hereto and their equivalents."

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A control apparatus of a vehicle, the control apparatus comprising:
    a twin clutch including a first clutch and a second clutch and configured to adjust power transmission from a drive motor to a first rear wheel and a second rear wheel of the vehicle through the first clutch corresponding to the first rear wheel and the second clutch corresponding to the second rear wheel;
    a vehicle controller electrically connected to the drive motor and configured to, when an entering condition for entering an oversteer mode is satisfied, determine an initial regenerative braking torque for entering the oversteer mode, determine a target slip ratio of the first and second rear wheels, and control the regenerative braking torque of the drive motor to follow the target slip ratio; and
    a clutch controller electrically connected to the twin clutch and configured to adjust clutch torques of the first clutch and the second clutch of the twin clutch so that slip ratios of the first and second rear wheels are synchronized.

2. The control apparatus of claim 1, wherein the entering condition includes at least one of:
    a drive mode of the vehicle being a sports mode;
    an accelerator pedal signal being OFF;
    a brake pedal signal being OFF;
    a steering angle of a steering wheel being above a preset angle; and
    an electronic stability control apparatus being in a $2^{nd}$ OFF state.

3. The control apparatus of claim 1, wherein the target slip ratio is determined based on a vehicle speed.

4. The control apparatus of claim 3, wherein the target slip ratio is determined to be inversely proportional to the vehicle speed.

5. The control apparatus of claim 1, wherein the initial regenerative braking torque is determined based on a vehicle speed.

6. The control apparatus of claim 5, wherein the initial regenerative braking torque is determined to be inversely proportional to the vehicle speed.

7. The control apparatus of claim 1, wherein, when a release condition is satisfied, the vehicle controller is configured to control the drive motor so that the vehicle runs in a normal drive mode.

8. The control apparatus of claim 7, wherein the release condition is satisfied when an operation signal of an accelerator pedal or a brake pedal of the vehicle is detected.

9. The control apparatus of claim 1, wherein the clutch controller is configured to adjust the clutch torques of the first clutch and the second clutch of the twin clutch so that:
    in an oversteer situation of the vehicle, a clutch torque of a clutch corresponding to a turning-external rear wheel among the first and second rear wheels is greater than a clutch torque of a clutch corresponding to a turning-inner rear wheel among the first and second rear wheels;
    in an understeer situation of the vehicle, the clutch torque of the clutch corresponding to the turning-external rear wheel among the first and second rear wheels is smaller than the clutch torque of the clutch corresponding to the turning-inner rear wheel among the first and second rear wheels; and
    in a counter-steer situation of the vehicle, the clutch torque of the clutch corresponding to the turning-external rear wheel is a same as the clutch torque of the clutch corresponding to the turning-inner rear wheel.

10. A control method of a vehicle, the control method comprising:
    determining, by a controller, whether an entering condition for entering an oversteer mode is satisfied;
    determining, by the controller, a target slip ratio of a rear wheel including first and second rear wheels when the entering condition is satisfied;
    applying, by the controller, an initial regenerative braking torque to the rear wheel through a drive motor;
    controlling, by the controller, the regenerative braking torque of the drive motor to follow the target slip ratio; and
    adjusting, by the controller, a clutch torque of a twin clutch including a first clutch corresponding to the first rear wheel and a second clutch corresponding to the second rear wheel so that slip ratios of the first and second rear wheels are synchronized.

11. The control method of claim 10, wherein the entering condition includes:
    a drive mode of the vehicle being a sports mode;
    an accelerator pedal signal being OFF;
    a brake pedal signal being OFF;
    a steering angle of a steering wheel being above a preset angle; and
    an electronic stability control apparatus being in a $2^{nd}$ OFF state.

12. The control method of claim 10, wherein the target slip ratio is determined based on a vehicle speed.

13. The control method of claim 12, wherein the target slip ratio is determined to be inversely proportional to the vehicle speed.

14. The control method of claim 10, wherein the initial regenerative braking torque is determined based on a vehicle speed.

15. The control method of claim 14, wherein the initial regenerative braking torque is determined to be inversely proportional to the vehicle speed.

16. The control method of claim 10, wherein, when a release condition is satisfied, the controller is configured to control the drive motor so that the vehicle runs in a normal drive mode.

17. The control method of claim 16, wherein the release condition is satisfied when an operation signal of an accelerator pedal or a brake pedal of the vehicle is detected.

18. The control method of claim 10, wherein the controller is configured to adjust the clutch torque of the twin clutch so that:

in an oversteer situation of the vehicle, a clutch torque of a clutch corresponding to a turning-external rear wheel among the first and second rear wheels is greater than a clutch torque of a clutch corresponding to a turning-inner rear wheel among the first and second rear wheels;

in an understeer situation of the vehicle, the clutch torque of the clutch corresponding to the turning-external rear wheel among the first and second rear wheels is smaller than the clutch torque of the clutch corresponding to the turning-inner rear wheel among the first and second rear wheels; and in a counter-steer situation of the vehicle, the clutch torque of the clutch corresponding to the turning-external rear wheel is a same as the clutch torque of the clutch corresponding to the turning-inner rear wheel.

19. A non-transitory computer readable storage medium on which a program for performing the control method of claim 10 is recorded.

* * * * *